US012799854B2

(12) United States Patent
Patel et al.

(10) Patent No.: US 12,799,854 B2
(45) Date of Patent: Nov. 17, 2026

(54) METHODS OF GENERATING HYDROGEN IN A SUBSURFACE FORMATION

(71) Applicant: Saudi Arabian Oil Company, Dhahran (SA)

(72) Inventors: Hasmukh A. Patel, Katy, TX (US); Ahmet Atilgan, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 566 days.

(21) Appl. No.: 18/464,767

(22) Filed: Sep. 11, 2023

(65) Prior Publication Data

US 2025/0084746 A1 Mar. 13, 2025

(51) Int. Cl.
*E21B 43/295* (2006.01)
*C01B 3/061* (2026.01)

(52) U.S. Cl.
CPC ............ *E21B 43/295* (2013.01); *C01B 3/061* (2013.01); *C01B 2203/0805* (2013.01); *C01B 2203/86* (2013.01)

(58) Field of Classification Search
CPC ................... E21B 43/295; C01B 3/061; C01B 2203/0805; C01B 2203/86; Y02E 60/36
USPC .......................................................... 423/657
See application file for complete search history.

(56) References Cited

U.S. PATENT DOCUMENTS

2011/0042074 A1 2/2011 Goldberg
2017/0284180 A1* 10/2017 Switzer ................. E21B 43/267

FOREIGN PATENT DOCUMENTS

CN 116590351 A * 8/2023 ................ C12P 3/00
WO 2012118410 A2 9/2012

OTHER PUBLICATIONS

English translation of CN-116590351-A Description. (Year: 2023).*

Gluyas, Jon Swarbrick, Richard. (2004). Petroleum Geoscience—4.5 The Trap. John Wiley & Sons. Retrieved from https://app.knovel.com/hotlink/pdf/id:kt003ZCV33/petroleum-geoscience/exploratio-the-trap. (Year: 2004).*

Dykstra et al., "Zeo-Valent Iron Enhances Biocathodic Carbon Dioxide Reduction to Methane", School of Civil and Envinmental Engineering, pp. 18, May 30, 2017.

Vyrides et al., "Co2 conversion to CH4 using Zero Valent Iron (ZVI) and anaerobic granular sludge: optimum batch conditions and microbial pathways", Manuscript, Department of Environmental Science and Technology, https://www.sciencedirect.com/science/article/pii/S2212982018302889, 2018.

* cited by examiner

*Primary Examiner* — Anthony J Zimmer
*Assistant Examiner* — Zachary John Baum
(74) *Attorney, Agent, or Firm* — Dinsmore & Shohl LLP

(57) ABSTRACT

A method of generating hydrogen in a subsurface formation, the method comprising injecting oxidizable metal particles into a subsurface formation comprising subsurface water and a geologic trap, wherein the subsurface water has a temperature of from 18° C. to 400° C. and a pressure of from 500 psi to 10,000 psi, the geologic trap comprises one or both of a structural trap or a stratigraphic trap, the geologic trap substantially prevents vertical migration of the subsurface water out of the subsurface formation, and the oxidizable metal particles react with the subsurface water to form hydrogen, metal oxides, metal hydroxides, or combinations thereof.

23 Claims, 1 Drawing Sheet

METHODS OF GENERATING HYDROGEN IN A SUBSURFACE FORMATION

FIELD

Embodiments of the present disclosure generally relate to the generation of hydrogen and, particularly, to methods of producing hydrogen in a subsurface formation.

BACKGROUND

Hydrogen has previously been investigated as an alternative energy source to fossil fuels to address climate change. However, due to hydrogen's relatively lower volumetric energy density, large amounts of compressed hydrogen gas are needed to replace or supplement fossil fuel and green energy sources. In the case of supplementing green energy sources, variability of demand may also be a concern, as supplemental demand may vary by the cycles of the day (solar), weeks (e.g. from wind), or months (seasonal use in heating).

On a related note, $CO_2$ emissions into the atmosphere, such as from fossil fuels, may contribute to climate change. Methods offsetting or reducing these $CO_2$ emissions include storing or sequestering the $CO_2$ for long time periods, e.g. thousands of years or longer. $CO_2$ can be captured directly at the point of emission, or it can be drawn from the atmosphere. Once captured it can be transported for injection into suitable underground long-term sequestration sites. Carbon dioxide may be injected into the sequestration site as the pure gas, which is buoyant relative to in situ water within the sequestration site regardless of the $CO_2$ phase in the subsurface reservoir—either gas or supercritical fluid (the phase change being depth and therefore pressure dependent). Therefore, injection of pure $CO_2$ requires a trapping mechanism suitable for positively buoyant fluid. Injection of pure $CO_2$, therefore, is restricted to locations where such a particular trap type exists and is subject to uncertainties associated with such traps, such as long-term efficacy of impervious caprock. These restrictions present a barrier to adopting sequestration of $CO_2$. Further, lack of economic motivation for sequestering $CO_2$ represents a further barrier to adopting sequestration of $CO_2$. Carbon credits and environmental regulations only provide limited motivation where a positive monetary benefit is also not present.

SUMMARY

Accordingly, there is a continual need for methods for generating and storing relatively large quantities of hydrogen that may respond to variabilities in demand. Described herein are methods for producing hydrogen in a subsurface formation that fulfill the aforementioned needs by the generation of hydrogen within the subsurface formation. Injected oxidizable metal particles may react with an aqueous solution within the subsurface formation to form hydrogen and metal oxide or metal hydroxides. In some embodiments, already present or injected carbon dioxide may also react with the aqueous solution to form carbonic acid, which may then react with the oxidizable metal particles and metal hydroxides to form additional hydrogen and metal carbonates as a product of the sequestration process.

In some embodiments, the metal carbonates may then precipitate and mineralize within the subsurface formation, sequestering the carbon dioxide. The hydrogen produced within the subsurface formation may then be stored for later sale or produced on-demand, potentially resulting in a positive economic product from carbon dioxide sequestration.

According to one embodiment, a method of generating hydrogen in a subsurface formation may comprise injecting oxidizable metal particles into a subsurface formation comprising subsurface water and a geologic trap, wherein the subsurface water has a temperature of from 18° C. to 400° C. and a pressure of from 500 psi to 10,000 psi. The geologic trap may comprise one or both of a structural trap or a stratigraphic trap, and the geologic trap may substantially prevent vertical migration of the subsurface water out of the subsurface formation. The oxidizable metal particles may react with the subsurface water to form hydrogen, metal oxides, metal hydroxides, or combinations thereof.

According to another embodiment, a method of generating hydrogen in a subsurface formation may comprise injecting a liquid solution of oxidizable metal particles into a subsurface formation comprising subsurface water and a geologic trap, wherein the subsurface water has a temperature of from 18° C. to 400° C. and a pressure of from 500 psi to 10,000 psi. The geologic trap may comprise one or both of a structural trap or a stratigraphic trap, and the geologic trap may substantially prevent vertical migration of the subsurface water out of the subsurface formation. The oxidizable metal particles may comprise iron nanoparticles, aluminum nanoparticles, or both, such that the oxidizable metal particles may comprise a particle size of less than or equal to 100 nm. The oxidizable metal particles may react with the subsurface water to form hydrogen, metal oxides, metal hydroxides, or combinations thereof.

Additional features and advantages of the embodiments described herein will be set forth in the detailed description which follows, and in part will be readily apparent to those skilled in the art from that description or recognized by practicing the embodiments described, including the detailed description and the claims which are provided hereinafter.

BRIEF DESCRIPTION OF THE DRAWINGS

The following detailed description of specific embodiments of the present disclosure can be best understood when read in conjunction with the following drawings in which.

These and other aspects of the present methods are described in further detail below with reference to the accompanying figures, in which one or more illustrated embodiments and/or arrangements of the systems and methods are shown. In the description of the embodiments that follows, like numerals denote like components across the various figures. The systems and methods of the present application are not limited in any way to the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods.

DETAILED DESCRIPTION

Figure 1B:
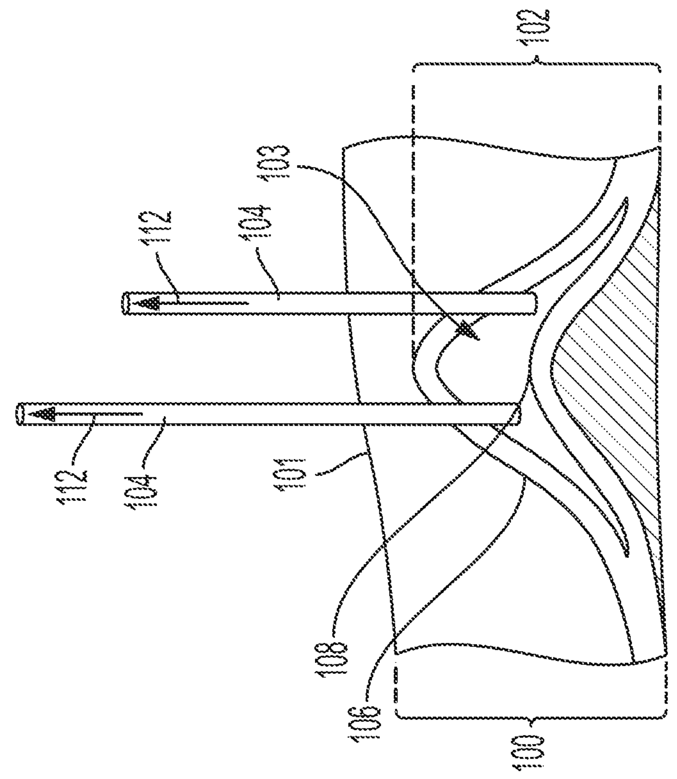
FIG. 1B is a schematic of the subterranean environment of FIG. 1A during hydrogen production after injection of the oxidizable metal particles and $CO_2$, according to embodiments herein.
Figure 1A:
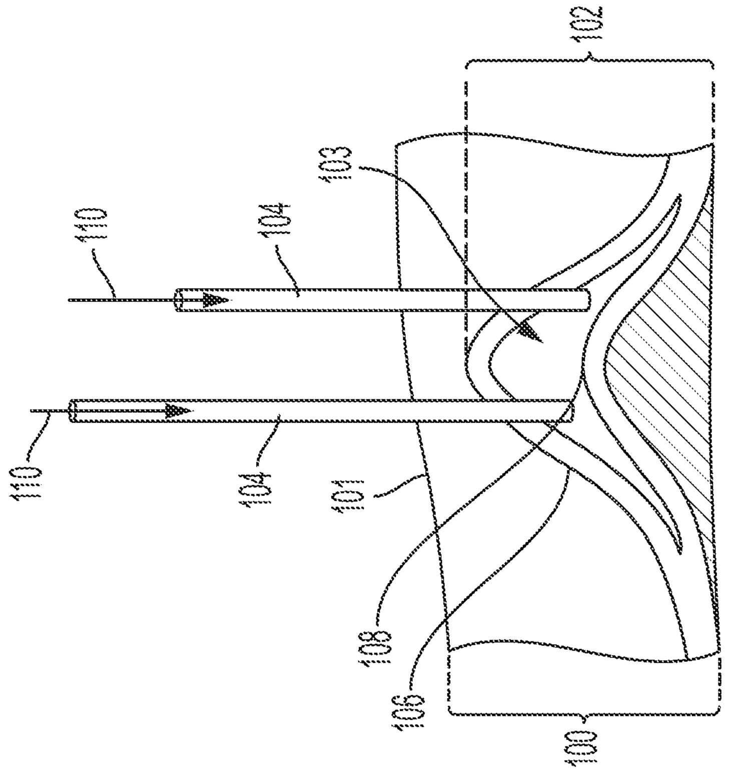
FIG. 1A schematically depicts a cross-section view of a subterranean environment, according to embodiments herein.

Embodiments described herein relate to methods for producing hydrogen in subsurface formations. Generally, the methods may include injecting oxidizable metal particles into a subsurface formation. The methods are described, in some instances, in the context of the subsurface formations of FIGS. 1A and 1B. However, it should be understood that the methods described herein may have applicability with other subsurface formations than are depicted in FIGS. 1A and 1B, as would be appreciated by those skilled in the art.

As used herein, the terms "downhole" and "uphole" may refer to a position within a wellbore relative to the surface, with uphole indicating direction or position closer to the surface and downhole referring to direction or position farther away from the surface. Similarly, as used herein, the terms "downward" and "upward" may refer to a position within a subterranean environment or subsurface formation relative to the surface, with upward indicating direction or position closer to the surface and downward referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used herein, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used herein, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, to prevent such interactions. The wellbore wall may also define the void volume of the wellbore.

Referring now to FIGS. 1A and 1B, and as previously stated, a method of generating hydrogen in a subsurface formation 102 may comprise injecting oxidizable metal particles into the subsurface formation 102. The method may further comprise injecting $CO_2$ into the subsurface formation before, after, or concurrently with the injection of the oxidizable metal particles into the subsurface formation 102. Still referring to FIGS. 1A and 1B, a subterranean environment 100 is depicted that can be utilized for the methods herein. The subterranean environment 100 may comprise the subsurface formation 102. The subsurface formation 102 may comprise any water-bearing strata or hydrocarbon formation generally known in the art, including but not limited to a sedimentary basin, or a carbonate reservoir, or combinations thereof. The subsurface formation 102 may also comprise subsurface water 103. As described herein, the subsurface water 103 may be pure water or any aqueous solution such as those selected from the group consisting of formation water; filtered seawater; untreated seawater; natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof.

The subsurface formation 102, and thereby the subsurface water 103, may be anaerobic. Without being limited by theory, the subsurface formation 102 and the subsurface water 103 being anaerobic may contribute to the increased generation of hydrogen rather than undesired byproducts, as explained in further detail hereinbelow. As used herein, a dissolved oxygen content of less than 1.0 mg/L of fluid, such as greater than or equal to 0 mg/L to less than 1.0 mg/L, may be considered "anaerobic", whereas a dissolved oxygen content of greater than or equal to 1.0 mg/L may be considered considered "aerobic."

The subsurface formation 102, and thereby the subsurface water 103, may have a temperature of at least 18° C., such as from 18° C. to 30° C., from 30° C. to 50° C., from 50° C. to 80° C., from 80° C. to 100° C., from 100° C. to 150° C., from 150° C. to 200° C., from 200° C. to 400° C., or any combination of the previous ranges or smaller range therein, such as from 50° C. to 200° C. The subsurface formation 102, and thereby the subsurface water 103, may also have a pressure of at least 500 psi, such as from 500 psi to 1,000 psi, from 1,000 psi to 2,000 psi, from 2,000 psi to 3,000 psi, from 3,000 psi to 4,000 psi, from 4,000 psi to 6,000 psi, from 6,000 psi to 10,000 psi, or any combination of the previous ranges or smaller range therein, such as from 500 psi to 4,000 psi. These conditions, as compared with ambient conditions, may promote the reactions described herein that form hydrogen and/or sequester carbon dioxide.

The subsurface formation 102 may also comprise a geologic trap 106. The geologic trap 106 may comprise one or both of a structural trap or a stratigraphic trap. The structural trap may comprise an anticline trap, a fault trap, or combinations thereof. The stratigraphic trap may comprise a pinch-out, an unconformity, a diapir, a caprock seal, or combinations thereof. The diapir may comprise a mud diapir, a salt diapir, or a magmatic diapir. As previously stated, the geologic trap 106 may also comprise a combination structural trap and stratigraphic trap. For example, the geologic trap 106 may be a cap-rock seal, such as an anticline cap-rock seal, overlying the subsurface formation 102, such as the anticline cap-rock seal illustrated in FIGS. 1A-1B, although other combinations are possible and contemplated.

Still referring to FIGS. 1A-1B, the geologic trap 106, such as the anticline cap-rock seal illustrated in FIGS. 1A-1B, may substantially prevent vertical migration of the subsurface water 103, or any of the other injected or produced fluids in the subsurface formation 102 as discussed in further detail hereinbelow, out of the subsurface formation 102. As used herein, features being capable of "substantially preventing migration" may mean an observed rate of transmission through the feature is less than or equal to 0.1% per year with reference to the total volume of gaseous fluids and or subsurface water 103 in the subsurface formation 102, the feature comprising an average permeability of less than or equal to 1 μD (microdarcy), such as from 1 μDs to 1 nD (nanodarcy), or both.

Still referring to FIGS. 1A-1B, the subsurface formation 102 may further comprise a base-rock seal 108. The base-rock seal 108 may underlie the subsurface formation 102, such that the base-rock seal 108 may substantially prevent downward migration of the subsurface water 103, or any of the other injected or produced fluids in the subsurface formation 102 as discussed in further detail hereinbelow, out of the subsurface formation 102. Also as shown in FIGS. 1A-1B, the base-rock seal 108 may meet with the geologic trap 106 such that the subsurface formation 102, and thereby the subsurface water 103, is trapped between the base-rock seal 108 and the geologic trap 106. However, this is not required for the methods of carbon dioxide sequestration and hydrogen production discussed herein.

Still referring to FIGS. 1A-1B, the subsurface formation 102 may further comprise one or more injection wells 104. As illustrated in FIG. 1A, the one or more injection wells 104 may be in fluid communication with the subsurface formation 102 via associated wellbores, and may be configured to inject one or more injection fluids 110 into the subsurface formation 102, as discussed in further detail hereinbelow. As illustrated in FIG. 2A, at least one of the one or more injection wells 104 may additionally be configured to produce formation fluids 112, such as the hydrogen, as discussed in further detail hereinbelow.

As previously stated, embodiments herein may also be directed to methods of producing hydrogen in the subsurface formation 102. The method may comprise injecting oxidizable metal particles into the subsurface formation 102. The method may also comprise injecting $CO_2$ into the subsurface formation 102. The oxidizable metal particles may be injected into the subsurface formation 102 before, after, or contemporaneously with the $CO_2$.

According to embodiments, the carbon dioxide may be injected as supercritical $CO_2$ or as a $CO_2$-containing liquid solution. Similarly, the oxidizable metal particles may be injected as a oxidizable metal particle liquid solution. Both the $CO_2$-containing liquid solution and the oxidizable metal particles may also comprise an aqueous solution comprising water selected from selected from the group consisting of formation water; filtered seawater; untreated seawater; natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof. Accordingly, referring still to FIG. 1A, the $CO_2$, the oxidizable metal particles, or both, may be the one or more injection fluids 110 illustrated in FIG. 1A. Similarly, the $CO_2$, the oxidizable metal particles, or both may be injected as the one or more injection fluids 110 via the one or more injection wells 104.

As described herein, the oxidizable metal particles are capable of undergoing oxidation reactions whereby the oxygen in water is utilized as the oxidizing agent to form a metal oxide that generally has a greater oxidation state than the oxidizable metal particles. As described herein, metal particles include oxides of metals. Generally, and as one skilled in the art would understand, suitable oxidation states that would allow for oxidation differ by metal material. For example, iron may be present as an oxide in oxidation states of 2 (FeO) or 3 ($Fe_2O_3$), or a mixture of 2 and 3 ($Fe_3O_4$, $Fe_4{\cdot}O_5$, $Fe_5O_6$, etc.). Iron may also be present with oxidation states of 0 or 1 (without being bound to oxygen), where an oxidation state of 0 would be referred to, sometimes, as a zero valence iron. Iron or iron oxides having oxidations states in iron of 0, 1, 2, or mixtures of 2 and 3 would be considered herein to be "oxidizable metals" while iron oxide in a oxidation state of 3 would not generally be an oxidizable metal. For each metal element, a similar analysis may be conducted to determine what is considered an oxidizable metal. However, generally, as described herein, metals in their greatest oxidation state are not considered oxidizable metals.

According to one or more embodiments, the oxidizable metal particles may have an average particle size of from 10 nm to 1 micron. In some embodiments, the oxidizable metal particles may be nanoparticles, such that the oxidizable metal particles comprise an average particle size of less than or equal to 100 nm, such as from 1 nm to 10 nm, from 10 nm to 30 nm, from 30 nm to 50 nm, from 50 nm to 75 nm, from 75 nm to 100 nm, from 100 nm to 1 μm, or any combination of these ranges or smaller range therein, such as from 10 nm to 100 nm. Particle size may be determined by known methods in the art, including visual inspection of particles by microscopy, where the particle size is the largest dimension of the particle in any direction.

Without being limited by theory, the oxidizable metal particles having a particle size in the nanometer range may have benefits when injecting into the subsurface formation 102. For example, and in embodiments, injection of particles in the millimeter size range may result in blockage of pore throats within the subsurface formation 102, reducing the distribution of the oxidizable metal particles within the subsurface water 103 and reducing the desired yield of hydrogen. Whereas particles in the nanometer size range may diffuse through the pore throats of the subsurface formation 102 and distribute throughout the subsurface water 103.

The oxidizable metal particles may, without limitation, comprise iron, aluminum, zinc, tin, cobalt, nickel, manganese, chromium, copper, titanium, magnesium, calcium, silicon, or combinations thereof, and may be present as non-oxidized materials or as oxides. The oxidizable metal particles may comprise at least 99 wt. % of iron, iron oxide, or aluminum, or any other single metal. In other embodiments, the oxidizable metal particles may include two or more metals, or two or more metal alloys of other metals. Some embodiments may include a mixture of particles, such as sometimes nanoparticles, having different compositions, respectively, or in other embodiments single nanoparticles may comprise two or more metals.

As previously stated, the oxidizable metal particles may be injected into the subsurface formation 102. In so doing, the oxidizable metal particles may contact the subsurface water 103, causing an oxidation reaction between the water of the subsurface water 103 and the oxidizable metal particles according to Equation I:

$$M^z + H_2O \rightarrow M_xO_y + H_2 \quad \text{(I)}$$

wherein M is the metal atom of the oxidizable metal, z is a whole number (i.e. 0, +1, +2, +3, +4, etc.), and x and y are natural numbers (i.e. 1, 2, 3, 4, etc.). Further, where the oxidizable metal is iron, the oxidation reaction may progress according to one or more of Equations II-VII depending on the oxidation state of the oxidizable iron, which are not meant to be limiting:

$$3Fe^0 + 4H_2O \rightarrow 4H_2 + Fe_3O_4 \quad \text{(II)}$$

$$2Fe^{2+} + 2H_2O \rightarrow 2Fe^{3+} + 2H_2O \rightarrow 2Fe^{3+} + H_2 + 2OH^- \quad \text{(III)}$$

$$Fe^{2+} + 2Fe^{3+} + 4H_2O \rightarrow Fe_3O_4 + 4H_2 \quad \text{(IV)}$$

$$2Fe^{3+}+3H_2O \rightarrow Fe_2O_3+3H_2 \quad (V)$$

$$2Fe^{2+}+2H_2O \rightarrow 2Fe^{3+}+H_2+2OH^- \quad (VI)$$

$$Fe^0+2H_2O \rightarrow Fe(OH)_2+CO_2 \quad (VII).$$

Further, where the oxidizable metal is aluminum, the oxidation reaction may progress according to one or more of Equations VIII-X, which are not meant to be limiting:

$$2Al^0+3H_2O \rightarrow 4H_2+Al_2O_3 \quad (VIII)$$

$$Al^{2+}+H_2O \rightarrow AlO+H_2 \quad (IX)$$

$$2Al^{3+}+3H_2O \rightarrow Al_2O_3+3H_2 \quad (X).$$

Also as previously stated, the $CO_2$ may also be injected into the subsurface formation 102. In so doing, the $CO_2$ may contact the subsurface water 103, causing the formation of dissolved carbon dioxide, un-dissociated carbonic acid, bicarbonate, and carbonate according to Equation XI. Further, metal hydroxides of the oxidizable metals, such as iron hydroxide, may participate in an oxidation reaction with the carbon dioxide to form metal carbonates and water, such as iron carbonate according to Equation VI:

$$CO_2 + H_2O \leftrightarrow H_2CO_3 \leftrightarrow H^+ + HCO_3^- \leftrightarrow 2H^+ + CO_3^{-2} \quad (XI)$$

$$Fe(OH)_2 + CO_2 \rightarrow FeCO_3 + H_2O.$$

The oxidizable metals may then participate in a corrosion reaction with the un-dissociated carbonic acid, forming additional hydrogen and metal carbonate according to Equation XIII:

$$M^z+H_2CO_3 \rightarrow H_2+M_x(CO_3)_y \quad (XIII).$$

The formation of metal carbonate in the subsurface formation 102 may operate to sequester (such as for a very long time period, i.e. for greater than or equal to 100 years, or permanently) the carbon dioxide in a solid form within the subsurface formation 102. The hydrogen produced within the subsurface formation 102 may then be stored within the subsurface formation 102 due to the geologic trap 106 or produced via at least one of the one or more injection wells 104.

Without being limited by theory, in an aerobic environment at least some of the oxidation reactions of the reduced state-metals may occur with oxygen (i.e., $O_2$) rather than water, generating metal oxides as products without the desired hydrogen. Similarly, the corrosion reactions of the oxidizable metals with un-dissociated carbonic acid may be at least partially occupied by the oxygen oxidation mechanism, reducing the desired yield of hydrogen and mineralized carbon dioxide (as metal carbonates) Particularly, without being limited by theory, approximately 1 mg/L of oxygen per liter of water may oxidize up to 2.33 mg/L of oxidizable iron per liter of water.

Accordingly, the reactions of the oxidizable metals with the subsurface water 103 and carbonic acid may benefit from being conducted in an anaerobic environment, rather than an aerobic environment. As previously stated, subsurface formations without access to surface water sources are primarily anaerobic, and so may provide increased yields of the desired hydrogen. Furthermore, the oxidizable metal particles, the $CO_2$, as well as any liquid solutions associated with the same, may also be anaerobic. For example, and in some embodiments described herein, the oxidizable metal particles may be injected along with the $CO_2$ in a liquid form to establish an anaerobic injection fluid. Additionally or alternatively, an oxygen scavenger may be injected along with the oxidizable metal particles, the $CO_2$, or both to eliminate free oxygen. Alternatively or additionally, the oxidizable metal particles themselves may have a coating or shell that is resistant to oxidation. For example, the oxidizable metal particles may have a water-soluble coating that is resistant to oxidation with oxygen, but reacts with the subsurface water when the water-soluble coating is dissolved by the same.

Without being limited by theory, the oxidation and dissolution reactions described above may also generally require a large amount of external energy to drive the reaction processes. Accordingly, subsurface formations generally have elevated temperatures and pressures, which are also known to generally increase with depth. Further, due to geomechanics and the size of most subsurface formations, the temperature and pressure may remain at a stable level even after injection of considerable amounts of fluid. Accordingly, for at least the above-stated reasons, conducting of the methods herein within the subsurface formation 102 may have considerable benefits in terms of the desired hydrogen yields.

EXAMPLES

A simulation was used to predict hydrogen generation in a subsurface formation 102 resembling that in FIGS. 1A-1B. A 1M solution of NaCl brine saturated with $CO_2$ was used to model the subsurface water 103. The solubility of the $CO_2$, the concentration of the reduced valence iron nanoparticles, and the predicted yield of hydrogen is shown below in Table 1 at a subsurface formation 102 temperature of 50° C.

TABLE 1

$CO_2$ solubility and $H_2$ production vs. Formation Pressure

| Pressure psi | $CO_2$ in NaCl Brine | $Fe^0$ in NaCl Brine | Produced $H_2$ in NaCl Brine | Total Amount of $CO_2$ | Total Amount of Produced $H_2$ |
|---|---|---|---|---|---|
| | metric tons per million $m^3$ | metric tons per million $m^3$ | metric tons per million $m^3$ | metric tons | metric tons |
| 500 | 20.96 | 13.3 | 0.48 | 8 | 0.18 |
| 1500 | 42.86 | 27.3 | 0.98 | 129.3 | 2.96 |
| 3000 | 48.91 | 31.2 | 1.12 | 258.5 | 5.92 |
| 4000 | 53.57 | 34.3 | 1.23 | 517.1 | 11.8 |

In Table 1 above, the ratio of produced hydrogen to reduced valence iron nanoparticles was approximately 2 kilograms of hydrogen for every 55.8 kilograms of reduced valence iron nanoparticles. However, for subsurface water not including $CO_2$ approximately 2 kilograms of hydrogen may be generated for every 48.85 kilograms of reduced valence iron nanoparticles.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A method of generating hydrogen in a subsurface formation, the method comprising:

injecting oxidizable metal particles into a subsurface formation comprising subsurface water and a geologic trap, wherein:

the subsurface water has a temperature of from 18° C. to 400° C. and a pressure of from 500 psi to 10,000 psi;

the geologic trap comprises one or both of a structural trap or a stratigraphic trap;

the geologic trap substantially prevents vertical migration of the subsurface water out of the subsurface formation; and the oxidizable metal particles react with the subsurface water to form hydrogen and one or more metal oxides or metal hydroxides; and injecting $CO_2$ into the subsurface formation before, after, or concurrently with the injection of the oxidizable metal particles into the subsurface formation, wherein:

the $CO_2$ reacts with the subsurface water to form carbonic acid, and the carbonic acid reacts with the oxidizable metal particles to form additional hydrogen and metal carbonate.

2. The method of claim 1, wherein the oxidizable metal particles are nanoparticles, such that the oxidizable metal particles comprise a particle size of from 10 nm to 100 nm.

3. The method of claim 1, wherein the oxidizable metal particles comprise iron, aluminum, or both.

4. The method of claim 1, wherein:

the oxidizable metal particles are injected as an oxidizable metal particle liquid solution;

the $CO_2$ is injected as supercritical $CO_2$ or as a $CO_2$-containing liquid solution, or both.

5. The method of claim 1, wherein the subsurface formation, the subsurface water, the oxidizable metal particles, and the $CO_2$ are anaerobic.

6. The method of claim 1, wherein:

the structural trap comprises an anticline trap, a fault trap, or combinations thereof; and the stratigraphic trap comprises a pinch-out, an unconformity, a diapir, a caprock, or combinations thereof.

7. The method of claim 1, wherein:

the subsurface formation further comprises a caprock seal overlying the subsurface formation; and the caprock seal substantially prevents upward migration of the subsurface water, the hydrogen, the $CO_2$, the carbonic acid, the oxidizable metal particles, the metal oxide, and the metal carbonate out of the subsurface formation.

8. The method of claim 7, wherein:

the subsurface formation further comprises a base-rock seal underlying the subsurface formation; and the base-rock seal substantially prevents downward migration of subsurface water, the hydrogen, the $CO_2$, the carbonic acid, the oxidizable metal particles, the metal oxide, and the metal carbonate out of the subsurface formation.

9. The method of claim 1, wherein the $CO_2$ and the oxidizable metal particles are injected into the subsurface formation via one or more injection wells in fluid communication with the subsurface formation.

10. The method of claim 9, further comprising producing the hydrogen from the subsurface formation from at least one of the one or more injection wells.

11. A method of generating hydrogen in a subsurface formation, the method comprising:

injecting a liquid solution of oxidizable metal particles into a subsurface formation comprising subsurface water and a geologic trap, wherein:

the subsurface water has a temperature of from 18° C. to 400° C. and a pressure of from 500 psi to 10,000 psi;

the geologic trap comprises one or both of a structural trap or a stratigraphic trap;

the geologic trap substantially prevents vertical migration of the subsurface water out of the subsurface formation;

the oxidizable metal particles comprise iron nanoparticles, aluminum nanoparticles, or both, such that the oxidizable metal particles comprise a particle size of less than or equal to 100 nm; and the oxidizable metal particles react with the subsurface water to form hydrogen, metal oxides, metal hydroxides, or combinations thereof.

12. The method of claim 11, further comprising injecting $CO_2$ into the subsurface formation before, after, or concurrently with the injection of the oxidizable metal particles into the subsurface formation, wherein:

the $CO_2$ is injected as supercritical $CO_2$ or as a $CO_2$-containing liquid solution;

the $CO_2$ reacts with the subsurface water to form carbonic acid; and the carbonic acid reacts with the oxidizable metal particles to form additional hydrogen and metal carbonate.

13. The method of claim 11, wherein the subsurface formation and the subsurface water are anaerobic.

14. The method of claim 12, wherein:

the $CO_2$ and the liquid solution of oxidizable metal particles are injected into the subsurface formation via one or more injection wells in fluid communication with the subsurface formation; and the method further comprises producing the hydrogen from the subsurface formation from at least one of the one or more injection wells.

15. A method of generating hydrogen in a subsurface formation, the method comprising:

injecting oxidizable metal particles into a subsurface formation comprising subsurface water and a geologic trap, wherein:

the subsurface water has a temperature of from 18° C. to 400° C. and a pressure of from 500 psi to 10,000 psi;

the geologic trap comprises one or both of a structural trap or a stratigraphic trap;

the geologic trap substantially prevents vertical migration of the subsurface water out of the subsurface formation, the oxidizable metal particles react with the subsurface water to form hydrogen and one or more metal oxides or metal hydroxides, the subsurface formation comprises a caprock seal overlying the subsurface formation, and a caprock seal overlays the subsurface formation, substantially preventing vertical migration of the subsurface water, the hydrogen, the oxidizable metal particles, and the one or more metal oxides or metal hydroxides out of the subsurface formation.

16. The method of claim 15, further comprising injecting $CO_2$ into the subsurface formation before, after, or concurrently with the injection of the oxidizable metal particles into the subsurface formation, wherein:

the $CO_2$ reacts with the subsurface water to form carbonic acid; and the carbonic acid reacts with the oxidizable metal particles to form additional hydrogen and metal carbonate.

17. The method of claim 15, wherein the oxidizable metal particles are nanoparticles, such that the oxidizable metal particles comprise a particle size of from 10 nm to 100 nm.

18. The method of claim 15, wherein the oxidizable metal particles comprise iron, aluminum, or both.

19. The method of claim 15, wherein:

the oxidizable metal particles are injected as an oxidizable metal particle liquid solution;

the $CO_2$ is injected as supercritical $CO_2$ or as a $CO_2$-containing liquid solution, or both.

20. The method of claim 15, wherein the subsurface formation, the subsurface water, the oxidizable metal particles, and the $CO_2$, are anaerobic.

21. The method of claim 15, wherein:

the structural trap comprises an anticline trap, a fault trap, or combinations thereof; and the stratigraphic trap comprises a pinch-out, an unconformity, a diapir, a caprock, or combinations thereof.

22. The method of claim 15, wherein:

the subsurface formation further comprises a base-rock seal underlying the subsurface formation; and the base-rock seal substantially prevents downward migration of subsurface water, the hydrogen, the $CO_2$, the carbonic acid, the oxidizable metal particles, the metal oxide, and the metal carbonate out of the subsurface formation.

23. The method of claim 15, wherein:

the $CO_2$ and the oxidizable metal particles are injected into the subsurface formation via one or more injection wells in fluid communication with the subsurface formation; and the method further comprises producing the hydrogen from the subsurface formation from at least one of the one or more injection wells.

* * * * *